(12) United States Patent
Wiemer et al.

(10) Patent No.: US 10,409,068 B1
(45) Date of Patent: Sep. 10, 2019

(54) BINOCULAR FEMTOPROJECTOR LAYOUTS

(71) Applicant: Spy Eye, LLC, Los Gatos, CA (US)

(72) Inventors: Michael West Wiemer, San Jose, CA (US); Steven Louis Sinclair, Los Gatos, CA (US); Hansong Zhang, Los Altos, CA (US); Brian Elliot Lemoff, Morgan Hill, CA (US); Ben H. Shelef, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 15/937,284

(22) Filed: Mar. 27, 2018

(51) Int. Cl.
*G02B 27/01* (2006.01)
*G02C 7/04* (2006.01)
*H04N 9/31* (2006.01)

(52) U.S. Cl.
CPC ............ *G02B 27/0172* (2013.01); *G02C 7/04* (2013.01); *H04N 9/3141* (2013.01); *G02B 2027/013* (2013.01); *G02B 2027/0132* (2013.01); *G02B 2027/0147* (2013.01)

(58) Field of Classification Search
CPC . G02B 27/0172; G02B 13/0085; G06F 3/013; G02C 7/04; H04N 9/3141
See application file for complete search history.

(56) References Cited

U.S. PATENT DOCUMENTS

| | | | | |
|---|---|---|---|---|
| 4,968,123 | A | * | 11/1990 | Fournier, Jr. .......... A42B 3/042 359/480 |
| 8,184,068 | B1 | | 5/2012 | Rhodes et al. |
| 8,482,487 | B1 | | 7/2013 | Rhodes et al. |
| 8,786,675 | B2 | | 7/2014 | Deering |
| 9,507,174 | B2 | | 11/2016 | Qin |
| 2015/0049004 | A1 | * | 2/2015 | Deering ............. G02B 27/0172 345/8 |
| 2015/0312560 | A1 | * | 10/2015 | Deering ............. G02B 13/0085 345/1.3 |
| 2016/0240013 | A1 | * | 8/2016 | Spitzer .................... G06F 3/013 |
| 2017/0078651 | A1 | * | 3/2017 | Russell ............. G02B 27/0172 |

OTHER PUBLICATIONS

U.S. Appl. No. 15/570,707, filed Oct. 30, 2017, Inventor Miller, G.D. et al., (copy not enclosed).

* cited by examiner

*Primary Examiner* — Tracy Y. Li
(74) *Attorney, Agent, or Firm* — Fenwick & West LLP

(57) ABSTRACT

A pair of eye-mounted displays includes a right eye-mounted display and a right eye-mounted display. Each eye-mounted display comprises a contact lens. A femtoprojector system in each contact lens projects an image onto a retina of a user's eye when the contact lens is mounted on the user's eye. When the pair of eye-mounted displays is mounted on the user's left eye and on the user's right eye, a left-eye image is projected onto the user's left eye retina and a right-eye image is projected onto the user's right eye retina. The two projected images only partially overlap within the user's binocular visual field.

19 Claims, 9 Drawing Sheets

BINOCULAR FEMTOPROJECTOR LAYOUTS

BACKGROUND

1. Technical Field

This disclosure relates generally to femtoprojector layouts for eye-mounted displays.

2. Description of Related Art

An eye-mounted display can be implemented with a tiny projector mounted inside a contact lens, for convenience referred to as a femtoprojector. The femtoprojector projects images onto the retina of a person wearing the contact lens. A typical femtoprojector may be no larger than about one or two millimeters in any dimension.

Eye-mounted displays can be used for virtual reality applications and also for augmented reality applications. In virtual reality applications, the images projected by the eye-mounted display replace what the user would normally see as his external environment. In augmented reality applications, the images projected by the eye-mounted display augment what the user would normally see as his external environment, for example they may appear as additions to the external environment.

The femtoprojectors in an eye-mounted display include an image source and an optical system. A femtoprojector's optical system is designed to project images from the image source onto the retina so that the images appear in a person's visual field.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1A:
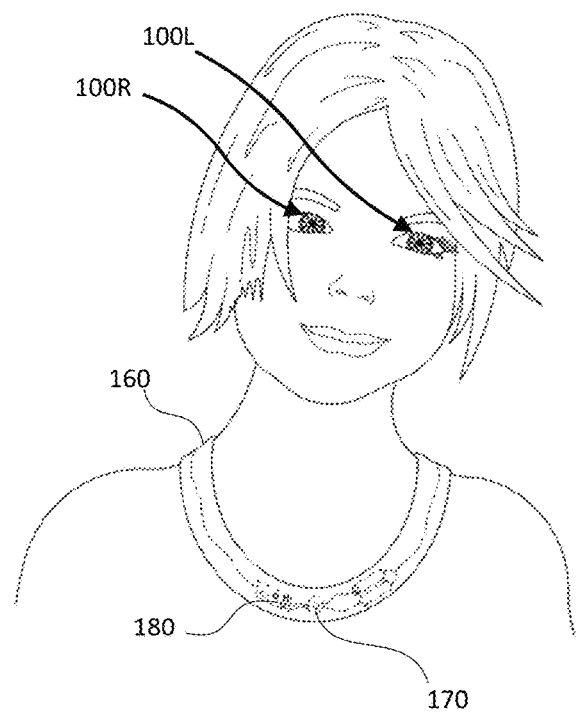
FIG. 1A shows a user wearing a pair of eye-mounted displays in communication with a necklace.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In human vision, each eye sees a visual field of a certain extent. The left eye's visual field extends from right of the nose to the far left periphery. The right eye's visual field extends from left of the nose to the far right periphery. These two visual fields overlap in the center of a person's vision and the images seen by the left and right eyes are fused together by the brain. For convenience, the region of overlap will be referred to as the binocular visual field. It includes the foveal region of a person's vision.

An eye-mounted display includes a contact lens that contains a femtoprojector system. The femtoprojector system includes one or more femtoprojectors that project an image onto a retina of a user's eye when the contact lens is mounted on the user's eye. When a pair of eye-mounted displays is mounted on the user's left eye and on the user's right eye, a left-eye image is projected onto the user's left eye retina and a right-eye image is projected onto the user's right eye retina. These projected images are fused together by the brain.

If the left-eye and right-eye displays together are projecting an image that occupies a target region of the user's binocular visual field, it is not necessary for each eye-mounted display to project an image that fully occupies the target region. Rather, the left-eye display can project an image onto the left eye retina that occupies the left side of the target region and the right-eye display can project an image onto the right eye retina that occupies the right side of the target region and, typically with some overlap in the center. The brain will fuse the left-eye and right-eye images into a single image that occupies the entire target region.

Because each individual eye's image occupies only a portion of the target region, the femtoprojector system in each contact lens handles a smaller image, which typically relaxes requirements on data transfer, power consumption and space required for electronics and optics. For example, consider a situation where the overall image is created by a central femtoprojector that projects to the fovea surrounded by six femtoprojectors that project to regions around the fovea. Rather, than include the central femtoprojector and all six peripheral projectors in each contact lens, each contact lens may instead include the central femtoprojector and half of the six peripheral projectors. In this example, the foveal visual field, where visual acuity is highest, is still covered by an overlapping area between the left-eye image and the right-eye image. In an alternate approach, the central femtoprojector could also be split, or partially split, between the left-eye and right-eye femtoprojector systems.

In more detail, FIG. 1A shows a user wearing a pair of eye-mounted displays 100 in communication with a necklace 160. The eye-mounted displays 100 include a left-eye eye-mounted display 100L and a right-eye eye-mounted display 100R. Throughout this application and the figures, the terms "left" and "right" are from the perspective of the user wearing the pair of eye-mounted displays 100.

Figure 1B:
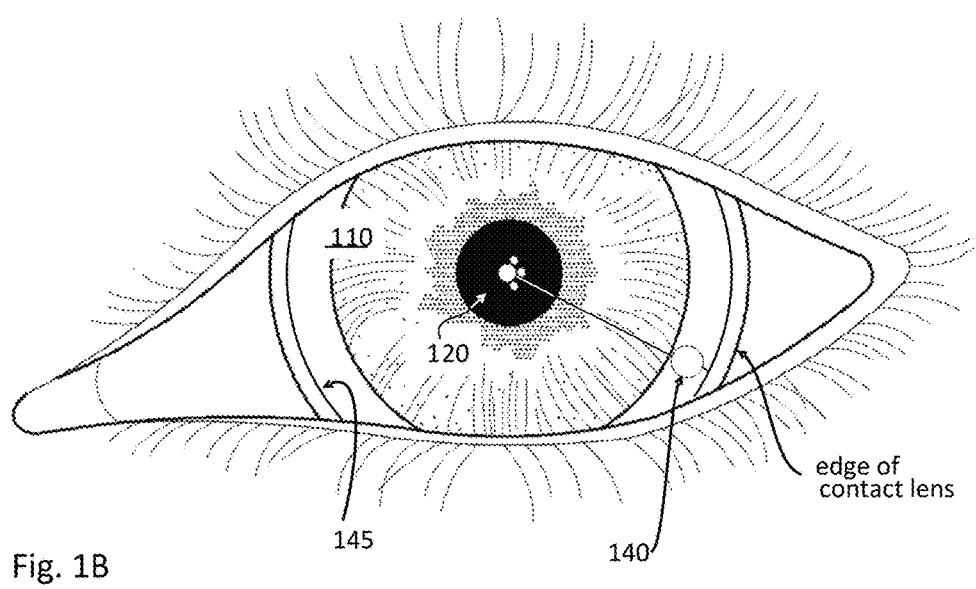
FIG. 1B shows a magnified view of the user's eye and an eye-mounted display.

FIG. 1B shows a magnified view of the user's eye and the left eye-mounted display 100. The eye-mounted display 100 includes a contact lens 110 that is worn on the surface of the eye. The following examples use a scleral contact lens but the contact lens does not have to be scleral. The contact lens 110 contains a femtoprojector system 120 with multiple femtoprojectors, some of which are central and some of which are peripheral. In FIG. 1B, the white circle in the center of the pupil represents a central foveal projector, and the three smaller surrounding white circles represent peripheral femtoprojectors. Each femtoprojector projects a sub-image onto the user's retina, and the sub-images combine to form the complete image from that eye-mounted display. Note that the peripheral projectors are not symmetric about the central foveal projector. Rather, they are all to the temporal side of the central foveal projector with no peripheral projectors on the nasal side of the central foveal projector. This will be explained in more detail below.

The contact lens 110 moves with the user's eye as the user's eye rotates in its socket. Because the projector system 120 is mounted in the contact lens 110, it also moves with the user's eye and generally will project an image onto the same region of the retina. The central foveal projector projects a high resolution sub-image to the fovea, and the peripheral projectors project lower resolution sub-images to more peripheral regions of the retina. Note that the user cannot center his gaze on the lower resolution sub-images produced by the peripheral projectors because, by definition, they will always be in the periphery.

In this example, the contact lens 110 also contains electronics 140 and a coil 145. In some embodiments, the coil 145 is a power coil that receives power wirelessly, for example via magnetic induction. In other embodiments, the contact lens 110 includes a battery that supplies power to the projector system 120. The electronics 140 may be used to control the femtoprojectors, receive image data wirelessly and provide the image data to the femtoprojectors and/or provide power to the femtoprojectors. The contact lens 110 may also include other components.

FIG. 1A shows an implementation where, in addition to the eye-mounted display 100, the user is also wearing a necklace 160 that contains components of the eye-mounted display system. In this example, the necklace 160 includes a wireless transmitter 170 that transmits image data and/or power to the eye-mounted display 100. For an eye-mounted display, the image transmission can be lower bandwidth, both because the available bandwidth is limited and because it is desirable to reduce the complexity and power consumption of electronics in the contact lens.

The necklace 160 may also include an image processing device 180. The image processing device 180 receives a source image to be projected by the pair of eye-mounted displays 100 onto the user's retinas. From the source image, the image processing device 180 generates image data describing a left-eye image for the left eye-mounted display 100L, and also image data describing a right-eye image for the right eye-mounted display 100R. The wireless transmitter 170 can transmit this image data to the pair of eye-mounted displays 100. The left eye-mounted display 100L uses the image data for the left-eye image to project a left-eye image onto a retina of the left eye. The right eye-mounted display 100R uses the image data for the right eye image to project a right-eye image onto a retina of the right eye. In some embodiments, the image processing device 180 may be separate from the necklace 160.

Figure 2A:
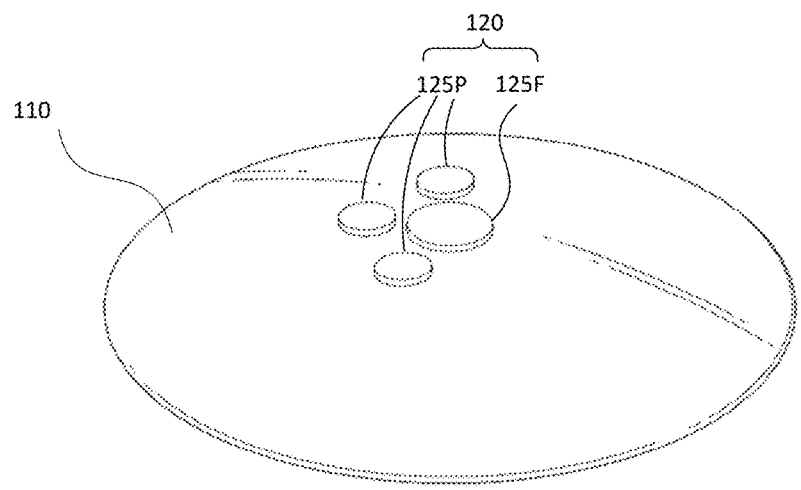
FIG. 2A shows a perspective view of an eye-mounted display containing a femtoprojector system in a scleral contact lens.
Figure 2B:
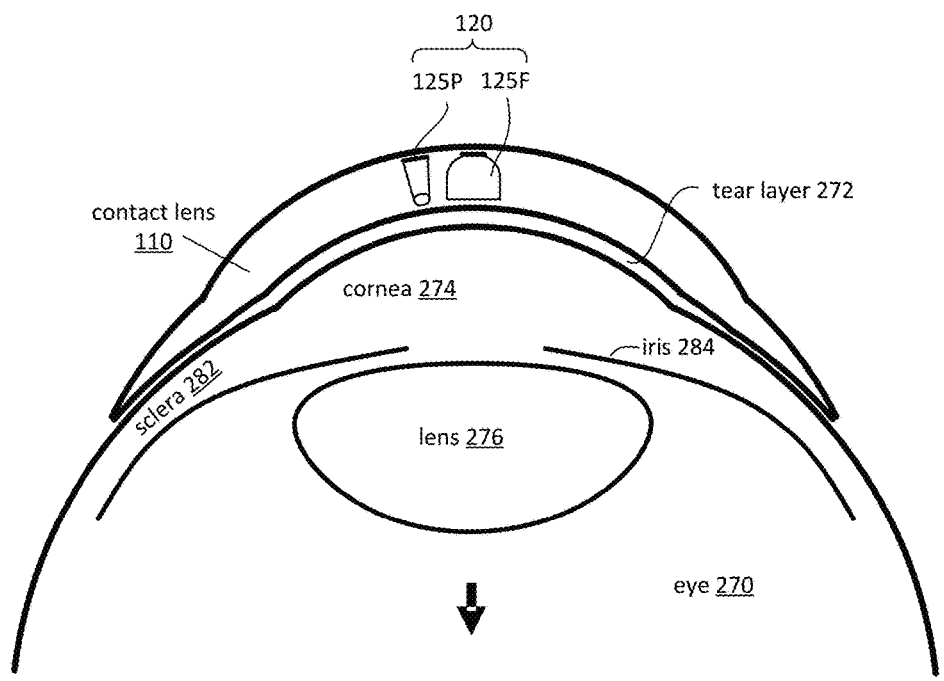
FIG. 2B shows a cross sectional view of an eye-mounted display containing a femtoprojector system in a scleral contact lens.

FIGS. 2A and 2B show a perspective view and a cross sectional view of an eye-mounted display containing a femtoprojector system 120 in a scleral contact lens 110. As shown, the projector system 120 includes two types of femtoprojectors: one central foveal projector 125F and three peripheral projectors 125P. Other components of the eye-mounted display are omitted from the figure for clarity. The contact lens 110 is separated from the cornea 274 of the user's eye 270 by a tear layer 272. Over the cornea 274, the tear layer 272 may be as thick as a hundred microns or more while it may be only a few microns thick over the sclera 282. The aqueous of the eyeball is located between the cornea 274 and the crystalline lens 276 of the eye. The vitreous fills most of the eyeball including the volume between the crystalline lens 276 and the retina 278. The iris 284 limits the aperture of the eye.

The contact lens 110 preferably has a thickness that is less than 2 mm, and each of the projectors 125 preferably fits in a 2 mm by 2 mm by 2 mm volume, or less. The contact lens 110 should be comfortable to wear and maintains eye health by permitting oxygen to reach the cornea 274. The optical paths from the image sources in the femtoprojectors 125 to the retina 278 may or may not include any air gaps, depending on the specific design.

Figure 3:
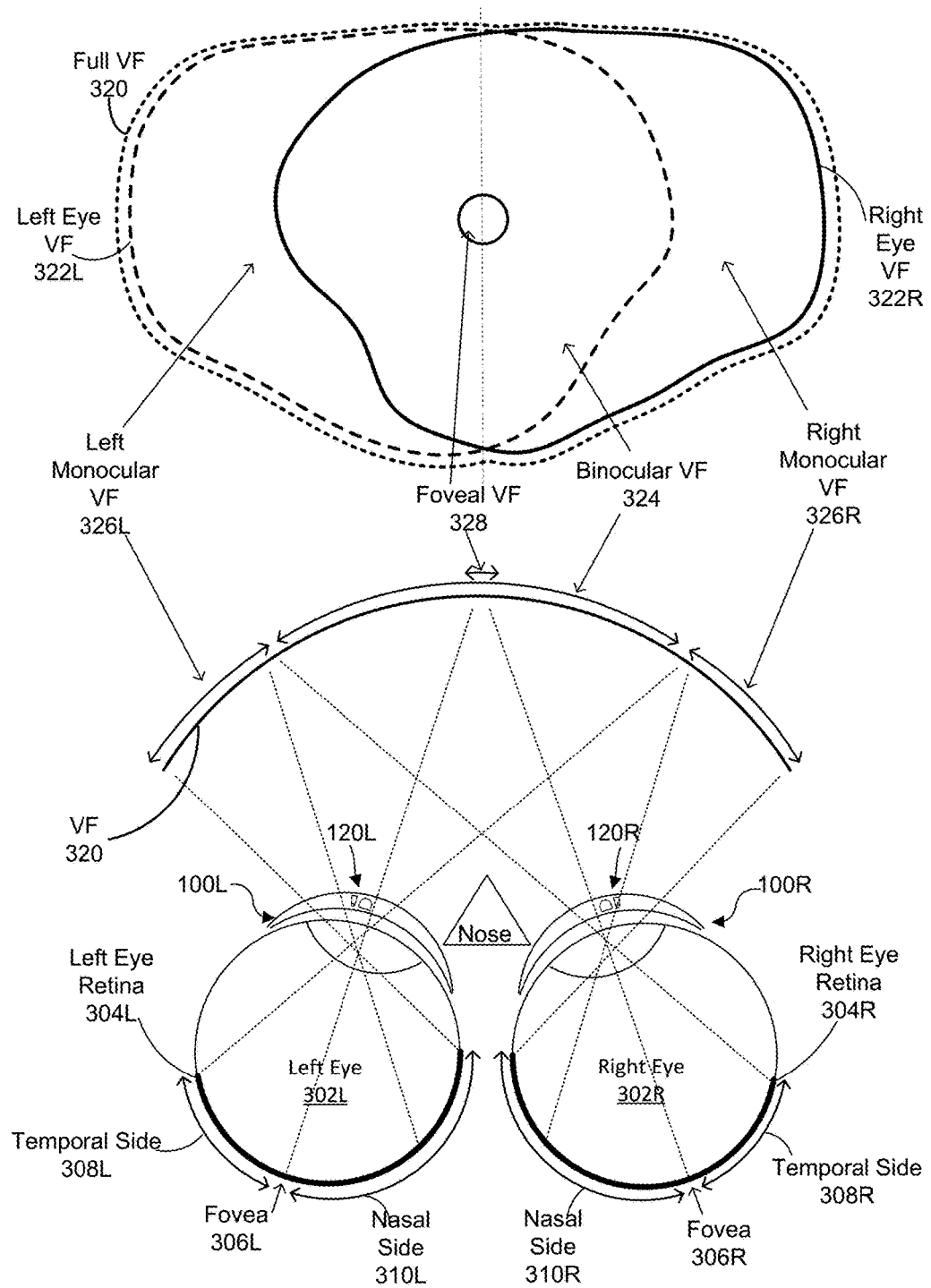
FIG. 3 is a diagram of a visual field seen by the user's eyes.

FIG. 3 is a diagram of a visual field seen by the user's eyes. The diagram is not drawn to scale. The diagram includes a left eye 302L and a right eye 302R. Each eye 302 includes a retina 304 and a fovea 306. The fovea is a central region of the retina that includes closely packed cones. The fovea is responsible for sharp central vision called foveal vision. Each retina 304 can be divided into a temporal side 308 and a nasal side 310 on different sides of the fovea. The nasal side retina is the side closer to the user's nose. The temporal side retina is the side that is closer to the user's temple and further from the user's nose.

The full visual field 320 is the total extent which can be seen by the two eyes 302L and 302R. The full visual field 320 is a superposition of a left-eye visual field 322L and a right-eye visual field 322R, which are the areas that can be seen by the left eye 302L and right eye 302R, respectively.

The binocular visual field 324 is an area where the left-eye visual field 322L and right-eye visual field 322R overlap. The left-eye monocular visual field 326L is an area covered by the left-eye visual field 322L but not reachable by the right-eye visual field 322R. The right-eye monocular visual field 326R is an area covered by the right-eye visual field 322R but not the left-eye visual field 322L. The foveal visual field 328 is in a central area of the binocular visual field 324 and is commonly viewed by both the left fovea 306L and right fovea 306R. The foveal visual field 328 may be the central two degrees of the visual field 320. The brain can fuse this foveal visual field 328 and a substantial area outside of the foveal visual field.

The left eye-mounted display 100L is mounted on the left eye 302L. The left femtoprojector system 120L projects a left-eye image (not shown) onto the left-eye retina 304L. The right eye-mounted display 100R is mounted on the right eye 302R. The right femtoprojector system 120R projects a right-eye image (not shown) onto the right-eye retina 304R.

There is a direct correspondence between points on the retinas 304 and points in the visual field 320. For example, images projected onto the fovea 306L,R will appear in the foveal visual field 328. Images projected onto the temporal side 308L of the left retina will appear in the right half of the full visual field 320, and images projected onto the nasal side 310L of the left retina will appear in the left half of the full visual field 320. This is also true for the right eye 302. In general, images projected to the temporal side 308 of the retina will appear in the far half of the visual field 320 (i.e., right half for the left eye, and left half for the right eye). Similarly, images projected to the nasal side 310 of the retina will appear in the near half of the visual field 320.

Conversely, in order for an image to appear in the left monocular visual field 326L, it is projected to the corresponding far nasal portion of the left eye retina 302L. Images that appear in the binocular visual field 324 can be projected onto either eye's retina 304 or to both. Here, the images that appear in the binocular field 324 are split between the two eye-mounted displays 100 so that the images projected onto the retinas 304L and 304R are only partially overlapping within the user's binocular visual field 324. This is explained in more detail by reference to FIGS. 4A-4D.

Figure 4A:
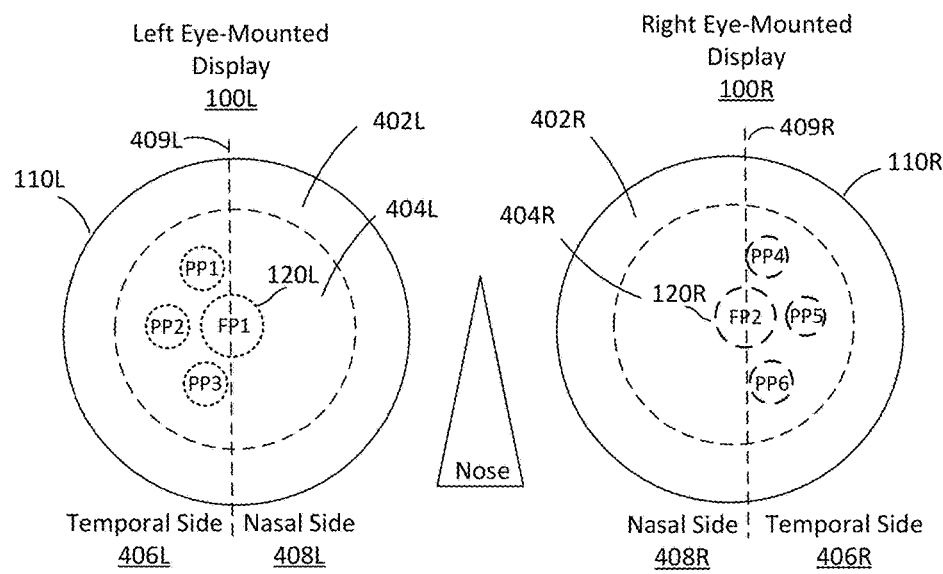
FIG. 4A shows projectors arranged in a pair of eye-mounted displays.
Figure 4B:
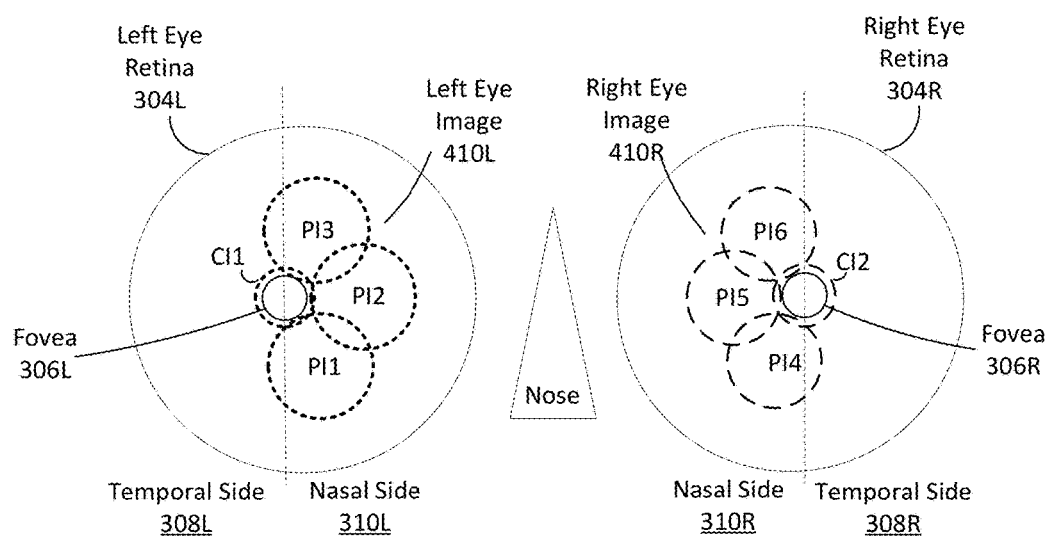
FIG. 4B shows images projected onto the user's retinas by the eye-mounted displays of FIG. 4A.

FIG. 4A shows projectors arranged in a pair of eye-mounted displays 100 and FIG. 4B shows images projected onto the user's retinas by the eye-mounted displays 100 of FIG. 4A. In these figures, the projectors are labelled as FP for the central foveal projector and PP for the peripheral projectors. FIG. 4A and FIG. 4B are drawn from the perspective of a person looking at the page. That is, the eye-mounted displays and retinas are viewed through the back of the user's head as if his head was transparent. The eye-mounted displays 110 are each roughly divided into an optical zone 404 and a non-optical zone 402. Components in the optical zone 404 may be in the optical path of the eye, depending on how far open the iris is. Components in the non-optical zone 402 are outside the aperture of the eye.

The left eye-mounted display 100L includes a projector system 120L located in the optical zone 404L of the left eye. The right-eye-mounted display 100R includes a projector system 120R in the optical zone 404R of the right eye. The ratio of the contact lens diameter to projector lateral size can be roughly 15:1 for the largest femtoprojector. This ratio is normally between about 15:1 and 30:1, but may be as small as 5:1 or smaller or as large as 50:1 or larger.

The left projector system 120L includes one central foveal projector FP1 and three peripheral projectors PP1-PP3. The left contact lens 110L includes a temporal side 406L and a nasal side 408L. The temporal side 406L and the nasal side 408L are located on different sides of a vertical axis 409L that passes through the central foveal projector FP1. The projectors have an asymmetric arrangement where more of the projectors are contained on a temporal side 406L of the left contact lens 110L than on a nasal side 408L of the left contact lens 110L. More specifically, more of the peripheral projectors PP1-PP3 are contained on a temporal side 406L than on a nasal side 408L of the left contact lens 110L.

The central foveal projector FP1 projects a central sub-image CI1 onto the left eye retina 304L. The peripheral projectors PP1-PP3 project corresponding sub-images PI1-PI3 onto the left eye retina 304L. The sub-images CI and PI combine together to form a left-eye image 410L. The left-eye image 410L is larger on the nasal side 310L of the retina than the temporal side 308L of the retina.

Similarly, the right projector system 120R includes one central foveal projector FP2 and three peripheral projectors PP4-PP6. The right contact lens 110R includes a temporal side 406R and a nasal side 408R. The temporal side 406R and the nasal side 408R are located on different sides of a vertical axis 409R that passes through the central foveal projector FP2. The projectors have an asymmetric arrangement where more of the projectors are contained on a temporal side 406R of the right contact lens 110R than on a nasal side 408R of the right contact lens 110R. More specifically, more of the peripheral projectors PP4-PP6 are contained on a temporal side 406R of the right contact lens 110R than on a nasal side 408R of the contact lens 110R.

The central foveal projector FP2 projects a central sub-image CI2 onto the right eye retina 304R. The peripheral projectors PP4-PP6 project corresponding sub-images PI4-PI6 onto the right eye retina 304R. The sub-images combine to form a right-eye image 410R. The right-eye image 410R is larger on the nasal side 310R of the retina than the temporal side 308R of the retina.

The retinal receptive fields are more densely packed towards the fovea 306 and become progressively less densely packed away from the fovea 306. The central foveal projectors FP that project to the foveas 306 can generate higher resolution central sub-images (CI1, CI2) on the retinas 304, and the peripheral projectors PP that project to the periphery of the retinas 304 generate correspondingly lower resolution sub-images (PI1-PI6). Note that the sub-images from the lower resolution peripheral projectors PP typically are larger in size. The central foveal projector FP is shown as being physically larger than the peripheral projectors PP because it has higher resolution (e.g. higher pixel density). In other embodiments, a femtoprojector system 120 may include fewer or greater number of projectors than those shown in the figures.

In one embodiment, the left eye-mounted display 100L is specialized for left eyes, and the right eye-mounted display 100R is specialized for right eyes. For example, the left eye-mounted display 100L may have a non-circular shape (e.g. oval) that is designed to fit the left eye and the right eye-mounted display 100R may have a non-circular shape (e.g. oval) that is designed to fit the right eye. As another example, the left eye-mounted display 100L may have a curvature that is custom fitted to the sclera of a specific user's left eye, and the right eye-mounted display 100R may have a curvature that is custom fitted to the sclera of a specific user's right eye.

In another embodiment, the pair of eye-mounted displays 100 is not specialized for left eyes or right eyes, and either can be mounted in either of the user's eyes. The eye-mounted displays 100 can be mounted on either of the user's eyes, so long as correctly oriented relative to the temporal side 406 and the nasal side 408. In FIG. 4A, the same eye-mounted display 100 may be used for both the left eye and right eye so long as the peripheral projectors PP are positioned on the temporal side 406. The eye mounted display can be mounted on the left eye as shown in FIG. 4A and then rotated 180 degrees and mounted on the right eye.

Regardless of whether the eye-mounted displays 100 are specialized for right eyes or left eyes, the eye-mounted displays 100L and 100R may be designed to have a specified rotational orientation when mounted on the eyes. In FIG. 4A, the desired rotational orientation results in the vertical axes 409L and 409R being located vertically when worn on the eyes. The eye-mounted displays 100L and 100R do not rotate once mounted to the eyes in the target rotational orientation.

Figure 4C:
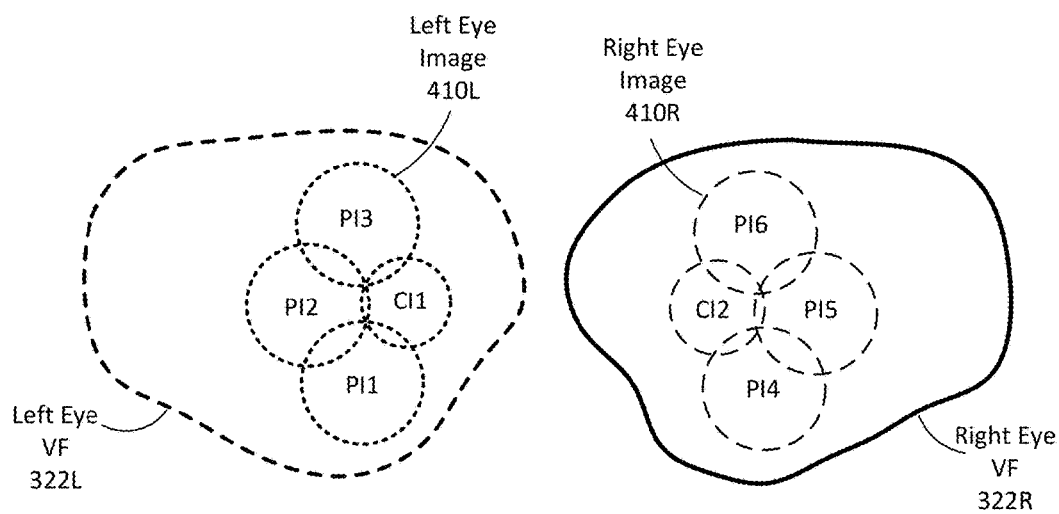
FIG. 4C shows the images from FIG. 4B in the left-eye and right-eye visual fields.

FIG. 4C shows the images from FIG. 4B in the left-eye and right-eye visual fields. Left-eye image 410L and its corresponding sub-images appear in the left-eye visual field 322L. Right-eye image 410R and its corresponding sub-images appear in the right-eye visual field 322R.

Figure 4D:
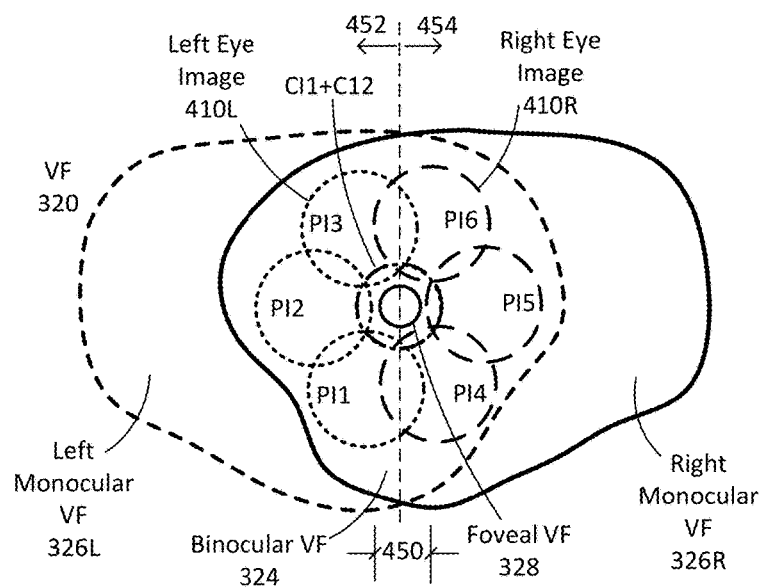
FIG. 4D shows the images from FIG. 4B in a combined visual field.

FIG. 4D shows the images from FIG. 4B in a combined visual field 320. Peripheral sub-images PI1-PI3 projected by the left peripheral projectors PP1-PP3 are primarily in the left half 452 of the binocular visual field 324. Peripheral sub-images PI4-PI6 projected by the right peripheral projectors PP4-PP6 are primarily in the right half 454 of the binocular visual field 324. Central sub-images CI1 and CI2 are also in the binocular visual field 324.

The location of the sub-images PI and CI results in a left-eye image 410L and right-eye image 410R that both appear in the binocular visual field 324 but that are only partially overlapping within the binocular visual field 324. Peripheral sub-image PI3 partially overlaps with peripheral sub-image PI6. Peripheral sub-image PI1 partially overlaps with peripheral sub-image PI4. Central sub-images CI1 and CI2 substantially overlap with each other in the foveal visual field 328.

The overlapping portions of the left-eye image 410L and the right-eye image 410R generally occupy a center region 450 within the user's binocular visual field 324. In FIG. 4D, the center region 450 where the left-eye image 410L and the right-eye image 410R overlap includes the user's entire foveal visual field 328. For example, each central foveal projector FP1, FP2 may project a central sub-image CI1, CI2 that occupy 5, 10, 15 or more degrees, whereas the actual fovea 306L,R occupies approximately 1 or 2 degrees.

The left-eye image 410L and right-eye image 410R each occupy the user's entire foveal visual field 328. In another embodiment, the center region 450 where the left-eye image 410L and the right-eye image 410R overlap may be smaller such that it includes only a part of the user's foveal visual field 328. In this embodiment, the left-eye image 410L and/or the right-eye image 410R may occupy only a part of the user's foveal visual field 328.

In this example, the left-eye image 410L and right-eye image 410R do not overlap in other portions of the binocular visual field 324 to the left and right of the center region 450 (although they could in other designs). The left-eye image 410L extends from the center region 450 to the left within the user's binocular visual field 324 and towards the left monocular visual field 326L. The right-eye image 410R extends from the center region 450 to the right within the user's binocular visual field 324 and towards the right monocular visual field 326R. In some embodiments, the left-eye image 410L may extend into the left monocular visual field 326L, and/or the right-eye image 410R may extend into the right monocular visual field 326R.

Stated differently, the binocular visual field 324 can be divided into a left half 452 and a right half 454. Each half of the binocular visual field 324 can be a "near" half or a "far" half relative to a particular eye. For the left eye, the left half 452 is the near half and the right half 454 is the far half. For the right eye, the right half 454 is the near half and the left half 452 is the far half.

Both the left-eye image 410L and the right-eye image 410R occupy a larger region in a corresponding near half of the binocular visual field 324 than in a corresponding far half of the binocular visual field 324. For example, from the perspective of the left eye, the left peripheral sub-images PI1-PI3 and the left-eye image 410L occupy a larger region in the near half 452 than the far half 454 of the binocular visual field 324. From the perspective of the right eye, the right peripheral sub-images PI4-PI6 and the right-eye image 410R occupy a larger region in the near half 454 than the far half 452 of the binocular visual field 324.

Referring back to FIG. 4A, the disclosed projector systems 120 only have a limited number of peripheral projectors PP surrounding the central foveal projector FP. An advantage of this projector arrangement is that the projector systems 120 block less ambient light than projector systems with a greater number of peripheral projectors (e.g. 6 peripheral projectors) which fully surround the central foveal projector. The limited number of peripheral projectors PP causes each individual image 410L and 410R to be smaller than the binocular visual field 324. However, the user's brain fuses the two smaller images 410L and 410R into the full desired image. In addition, the foveal visual field 328, where visual acuity is highest, is still covered by both the left-eye image 410 and the right-eye image 410R.

In other embodiments, the arrangement of projectors in a femtoprojector system 120 may be different than shown in FIG. 4A. For example, the femtoprojector system 120 of a contact lens 110 may include more than three peripheral projectors PP or fewer than three peripheral projectors PP. Some of the peripheral projectors PP may also be arranged on the nasal side 408 of a contact lens 110. There may also be more or fewer foveal projectors, or even zero foveal femtoprojectors. The foveal projectors FP may also produce images that are only partially overlapping. For example, the left-eye foveal projector(s) may produce images that occupy the left part of the foveal visual field, and the right-eye projector(s) may produce images that occupy the right part of the foveal visual field. The arrangement of projectors in the left and right contact lenses also do not have to be mirror images of each other.

As another example, the femtoprojector systems 120 shown in FIG. 4 have a "crossing" configuration. The femtoprojectors on the temporal side 406 of the eye-mounted display project images to the nasal side 310 of the retina. This can relax requirements on the overall optical design, but it is not required. There can be other mappings of projector position to image position on the retina.

Figure 5A:
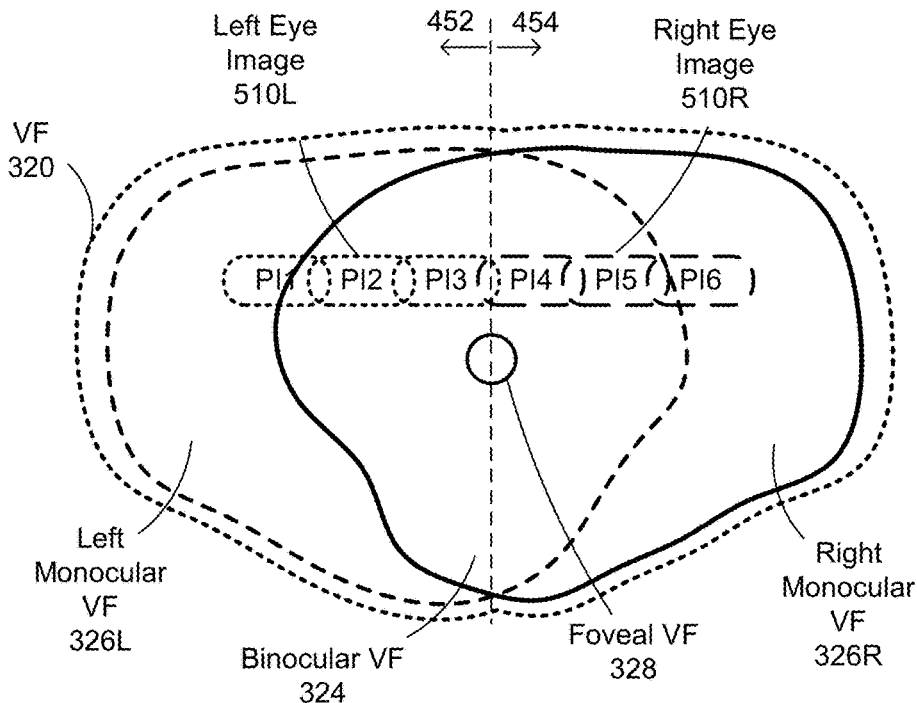
FIGS. 5A-5C show images from other arrangements of projectors in a pair of eye-mounted displays.

FIG. 5A shows images from another arrangement of projectors in a pair of eye-mounted displays. In this example, there are no foveal projectors. There are only six peripheral projectors, three for the left contact lens and three for the right contact lens. The three peripheral projectors in the left contact lens produce the left-eye image 510L with dotted sub-images PI1-PI3, which are primarily in the left half 452 of the visual field 320 but including both the binocular visual field 324 and the left monocular visual field 326L. The three peripheral projectors in the right contact lens produce the right-eye image 510R with dashed sub-images PI4-PI6, which are primarily in the right half 454 of the visual field 320 but including both the binocular visual field 324 and the right monocular visual field 326R. The aggregate image occupies a rectangular bar shape in the peripheral vision above the fovea.

Figure 5B:
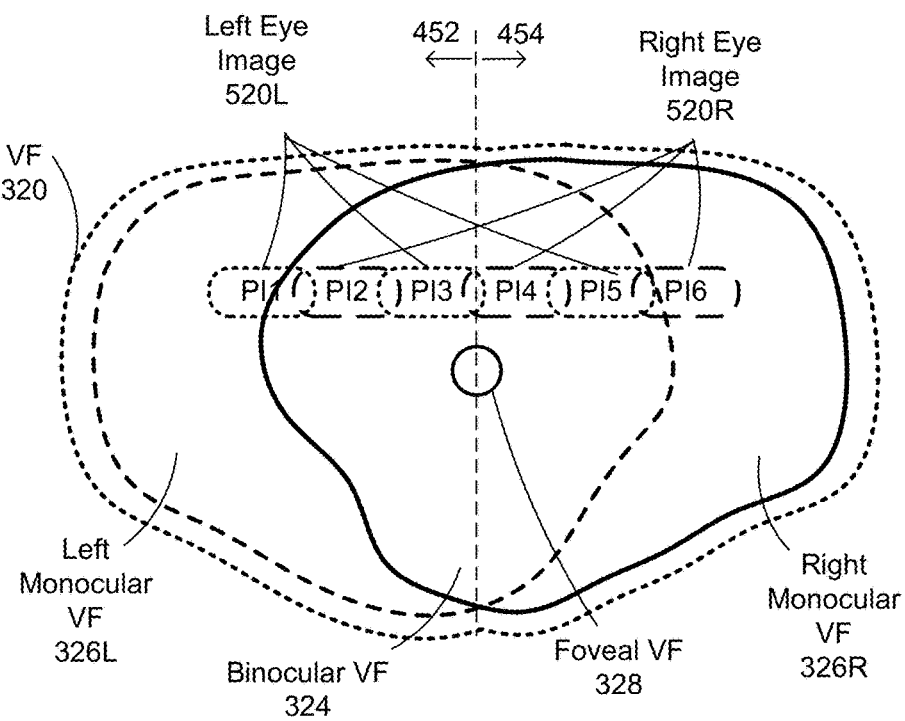
Figure 5C:
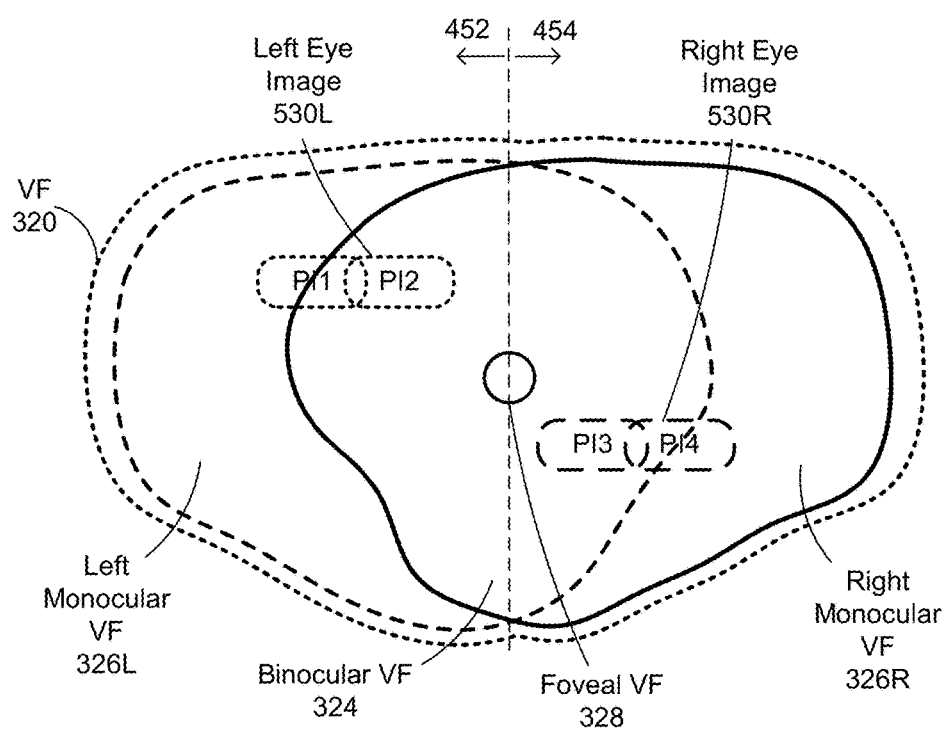

In FIG. 5B, the projected image is the same, but the correspondence between projectors and sub-images is different. Here, the left-eye image 520L includes sub-images PI1, PI3 and PI5, which are projected by projectors in the left contact lens. The right-eye image 520R includes sub-images PI2, PI4 and PI6, which are projected by projectors in the right contact lens. FIG. 5C shows a final example where there is no overlap at all. The left-eye image 530L has two sub-images PI1, PI2 and forms a rectangular bar to the upper left of the fovea. The right-eye image 530R has two sub-images PI3, PI4 and forms a rectangular bar to the lower right of the fovea. Other arrangements of femtoprojectors and sub-images are possible.

Figure 6:
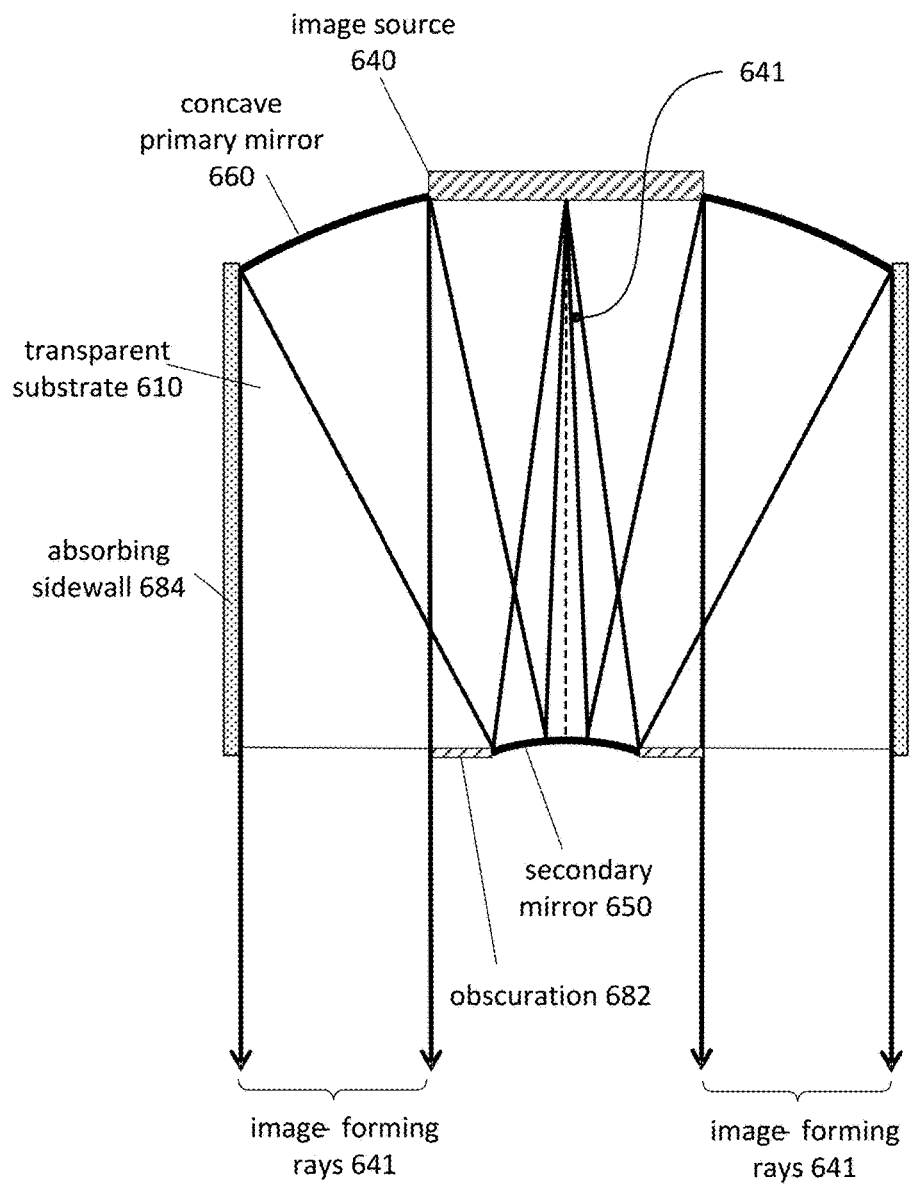
FIG. 6 shows a cross sectional view of an example design for a central foveal projector.

FIG. 6 shows a cross sectional view of an example design for a central foveal projector. This example includes a solid, transparent substrate 610 having index of refraction $n_1$. Contact lens material, in which a projector optical system may be embedded, has an index of refraction $n_2$. The solid transparent substrate 610 may be made from plastic, glass or other transparent materials.

The optical system of FIG. 6 includes a concave primary mirror 660 and a convex secondary mirror 650. Either or both of these may be aspheric. The concave primary mirror 660 may be formed by coating an end of the substrate 610 with a reflective material such as a metal (e.g. aluminum or silver) or an engineered stack of dielectric layers. The shape of the primary mirror 660 may be made by any of several different techniques. For example, if the substrate is injection-molded plastic, then the shape of the primary mirror 660 follows the shape of the mold used. Alternatively, the shape of the primary mirror 660 may be made by diamond turning the substrate on a lathe. Or, the shape of the primary mirror 660 may be made by photolithography and etching steps. Gray scale photolithography may be used to etch a mirror surface profile, for example. Wafer scale optics techniques including embossing, compression molding and/or UV curing photosensitive polymers may also be used to form mirror profiles. Additive manufacturing or three-dimensional printing (e.g. via two-photon polymerization) techniques may also be employed.

The primary mirror 660 includes a mounting area. An image source 640, such as an LED (light emitting diode) display chip with an array of individually addressable emitters, is mounted at this location. Alternate image sources include illuminated photomasks or single light emitting diodes, as examples.

The secondary mirror 650 faces the image source 640, and the primary mirror 660 faces the secondary mirror 650. Light rays 641 from the image source 640 are first incident on and reflected by the secondary mirror 650 (convex in this example). The reflected rays 641 are then incident on and further reflected by the primary mirror 660 before exiting the optical system. When the optical system is used in a femtoprojector, light from the image source 640 strikes the secondary mirror 650 before the primary mirror 660. Although the secondary mirror 650 in FIG. 6 is drawn smaller than the image source 640, it need not be. The secondary mirror 650 and primary mirror 660 cooperate to project the image from the image source 640 onto the user's retina.

The system also includes a light baffle system to block or at least reduce the stray rays that reach the exit aperture and/or to direct stray rays to areas away from the projected image. In FIG. 6, the baffle system includes an absorbing obscuration 682 and sidewalls 684 (or other types of side baffles). Additional examples of foveal projectors are described in U.S. patent application Ser. No. 15/570,707, "Femtoprojector Optical Systems," which is incorporated by reference herein.

Figure 7:
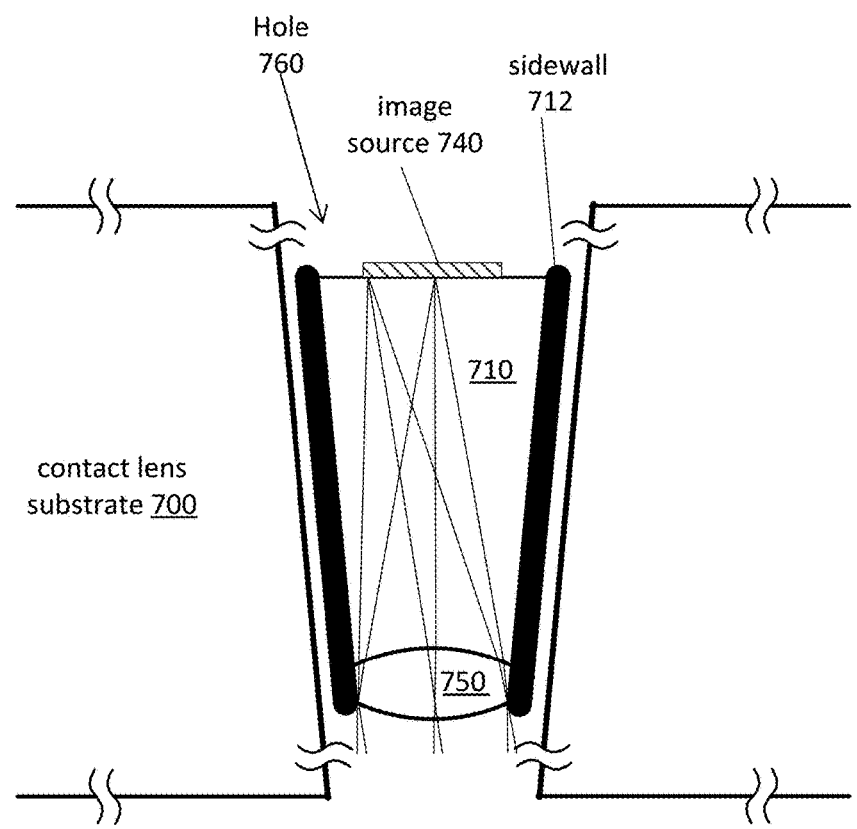
FIG. 7 shows a cross sectional view of an example design for a peripheral projector.

FIG. 7 shows a cross sectional view for an example design of a peripheral projector. In FIG. 7, the optical system includes an air core 710, for example the interior of a hollow tube. The air core 710 has the shape of a conical frustum. The sides 712 of the air core are constructed of or are coated with an absorbing material. The large end of the frustum contains the image source 740. The opposite end contains a lens element 750, which in this example is a biconvex lens.

The sidewall structure 712 reduces stray rays from the image source. Most rays incident on the sidewall structure 712 are absorbed. If the sidewall 712 is not perfectly absorbing, some rays may be reflected or scattered. Due to the geometry, reflected rays typically are reflected away from the exit aperture (lens element 750).

In FIG. 7, a tapered hole 760 is formed in the contact lens substrate 700, which may be a rigid gas permeable material. The femtoprojector is inserted into the tapered hole 760. The hole 760 may include alignment aids to aid in positioning the projector. The drawing of FIG. 7 includes a gap between the femtoprojector and the sides of the hole so that the reader can distinguish the two.

In one design, the image source 740 is 250 um wide, and the frustum base (the end with the image source 740) is 500 um in diameter. The other end with the lens 750 is 300 um in diameter. The entire optical system from the image source 740 (not including the thickness of the image source) to the end of the lens 750 is 950 um long. The core 710 is an air core. This design is capable of achieving 20/72 resolution if the pixels in the image source 740 have a 1 um pitch. The field of view is 15 degrees. Variants can support 20 degree and larger fields of view.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A pair of eye-mounted displays, each eye-mounted display comprising:
    a contact lens that comprises a femtoprojector system to project an image onto a retina of a user's eye when the contact lens is mounted on the user's eye; and
    when the pair of eye-mounted displays is mounted on the user's left eye and on the user's right eye, a left-eye image projected onto the user's left-eye retina and a right-eye image projected onto the user's right-eye retina are only partially overlapping within the user's binocular visual field such that overlapping portions of the left-eye image and the right-eye image are projected onto a same portion of the left-eye retina and the right-eye retina independent of each eye's location within a socket.

2. The pair of eye-mounted displays of claim 1, wherein overlapping portions of the left-eye image and the right-eye image occupy a center region within the user's binocular visual field, the left-eye image extends from the center region to the left within the user's binocular visual field, and the right-eye image extends from the center region to the right within the user's binocular visual field.

3. The pair of eye-mounted displays of claim 2, wherein the left-eye image extends further to the left towards the user's left monocular visual field, and the right-eye image extends further to the right towards the user's right monocular visual field.

4. The pair of eye-mounted displays of claim 1, wherein the overlap between the left-eye image projected onto the user's left-eye retina and the right-eye image projected onto the user's right-eye retina includes the user's entire foveal visual field.

5. The pair of eye-mounted displays of claim 1, wherein the overlap between the left-eye image projected onto the user's left-eye retina and the right-eye image projected onto the user's right-eye retina does not include any of the user's foveal visual field.

6. The pair of eye-mounted displays of claim 1, wherein both the left-eye image and the right-eye image occupy a larger region to a near half of the binocular visual field than to a far half of the binocular visual field.

7. The pair of eye-mounted displays of claim 1, wherein for each eye-mounted display: the femtoprojector system comprises one or more projectors, and more of the projectors project sub-images to a near half of the binocular visual field than to a far half of the binocular visual field.

8. The pair of eye-mounted displays of claim 1 wherein for each eye-mounted display: the femtoprojector system comprises a foveal projector and one or more peripheral projectors, and more of the peripheral projectors project sub-images to a near half of the binocular visual field than to a far half of the binocular visual field.

9. The pair of eye-mounted displays of claim 1 wherein for each eye-mounted display: the femtoprojector system comprises one or more projectors, and more of the projectors are contained on a temporal side of the contact lens than on a nasal side of the contact lens.

10. The pair of eye-mounted displays of claim 1 wherein for each eye-mounted display: the femtoprojector system comprises a foveal projector and one or more peripheral projectors, and more of the peripheral projectors are contained on a first side of the contact lens than on a second side of the contact lens.

11. The pair of eye-mounted displays of claim 1 wherein one of the pair of eye-mounted displays is specialized for left eyes, and the other of the pair of eye-mounted displays is specialized for right eyes.

12. The pair of eye-mounted displays of claim 1 wherein the pair of eye-mounted displays is not specialized for left eyes or right eyes, and either can be mounted on either of the user's eyes.

13. The pair of eye-mounted displays of claim 12 wherein each eye-mounted display has a temporal side and a nasal side, but may be mounted on either of the user's eyes so long as mounted in accordance with the temporal side and the nasal side.

14. A system comprising:
the pair of eye-mounted displays of claim 1; and
an image processing device to receive a source image to be projected by the pair of eye-mounted displays as appearing within the user's binocular visual field, and to generate data specifying the left-eye image and right-eye image for the pair of eye-mounted displays from the source image.

15. One of a pair of eye-mounted displays for projecting images as appearing within a user's binocular visual field, comprising:
a contact lens that comprises a femtoprojector system to project an image onto a retina of the user's eye when the contact lens is mounted on the user's eye, where the projected image occupies a larger region to a near half of the binocular visual field than to a far half of the binocular visual field, wherein the femtoprojector system comprises a foveal projector and one or more peripheral projectors, and wherein more of peripheral projectors are located on a first side of the contact lens than on a second side of the contact lens.

16. The eye-mounted display of claim 15 wherein the projected image occupies the user's entire foveal visual field.

17. The eye-mounted display of claim 15 wherein the femtoprojector system comprises one or more projectors, and more of the projectors project images to the near half of the binocular visual field than to the far half of the binocular visual field.

18. The eye-mounted display of claim 15 wherein the femtoprojector system comprises a foveal projector and one or more peripheral projectors, and more of the peripheral projectors project images to the near half of the binocular visual field than to the far half of the binocular visual field.

19. The eye-mounted display of claim 15 wherein the first side is a temporal side, and wherein the second side is a nasal side.

* * * * *

UNITED STATES PATENT AND TRADEMARK OFFICE
CERTIFICATE OF CORRECTION

PATENT NO. : 10,409,068 B1
APPLICATION NO. : 15/937284
DATED : September 10, 2019
INVENTOR(S) : Michael West Wiemer et al.

It is certified that error appears in the above-identified patent and that said Letters Patent is hereby corrected as shown below:

On the Title Page

Under Abstract (57), Lines 1-2, delete "A pair of eye-mounted displays includes a right eye-mounted display and a right eye-mounted display." and insert --A pair of eye-mounted displays includes a left eye-mounted display and a right eye-mounted display.--

Signed and Sealed this
Fifth Day of May, 2020

Andrei Iancu
*Director of the United States Patent and Trademark Office*